(No Model.)

M. RENSHAW & W. H. HORNER.
FASTENING FOR COUPLING OR JOINT PINS.

No. 349,004. Patented Sept. 14, 1886.

WITNESSES
S. L. Schrader.
Edwin Santer

INVENTORS
William H. Horner
Morrison Renshaw
Paul Bakewell
Atty.

UNITED STATES PATENT OFFICE.

MORRISON RENSHAW AND WILLIAM H. HORNER, OF ST. LOUIS, MISSOURI

FASTENING FOR COUPLING OR JOINT PINS.

SPECIFICATION forming part of Letters Patent No. 349,004, dated September 14, 1886.

Application filed June 24, 1886. Serial No. 206,149. (No model.)

*To all whom it may concern:*

Be it known that we, MORRISON RENSHAW and WILLIAM H. HORNER, citizens of the United States, residing at the city of St. Louis, State of Missouri, have invented a certain new and useful Improvement in Fastenings for Coupling or Joint Pins, of which the following is a full, clear, and exact description.

Our invention relates to improved means of securing pins used for car-couplings, connecting-rod joints, hinges, and other purposes, and has for its object to enable such pins to be passed freely through their joint-holes, and at the same time prevent their accidental escape from the latter, so as to dispense with the use of screwed nuts, keys, washers, and pins, or other devices hitherto used for the purpose.

Figure 1:
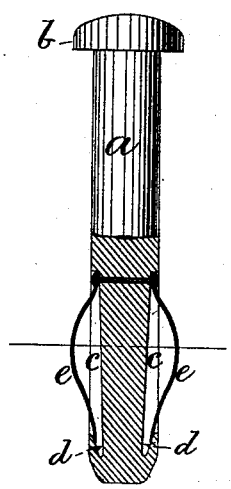
Figure 2:
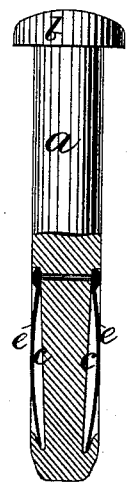
Figure 3:
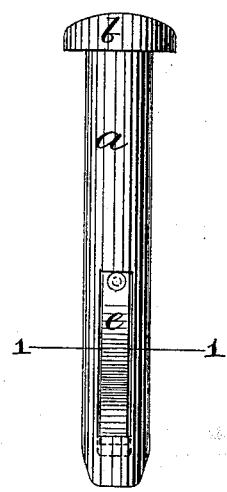
Figure 4:
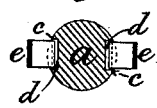

On the accompanying drawings, Figure 1 is a longitudinal sectional elevation of a coupling or joint pin provided with our improved fastening in position for holding the pin. Fig. 2 is a like view with the fastening in position for inserting or withdrawing the pin; Fig. 3, a longitudinal elevation of the pin and fastening, taken at right angles to Fig. 1; Fig. 4, a section through line 1 1 in Fig. 3; and Fig. 5, a longitudinal sectional elevation of a modified form of the fastening, like letters of reference denoting like parts in all the figures.

$a$ represents a coupling or joint pin, which is formed longitudinally on opposite parts of its circumference at a suitable distance from the head $b$ with rectangular-shaped grooves or recesses $c$, the ends of which farthest from the head $b$ are extended or cut into and surrounded by the solid portion of the pin $a$, so as to form thereat pockets $d$. To the bottom of each groove or recess $c$, at the end nearest to the head $b$, is screwed, riveted, or otherwise secured a spring, $e$, which normally tends to spring outward convexly externally from the pin $a$, its free end being inserted and remaining at all times within the pocket $d$.

On passing the end of the pin $a$ through the joint-holes the springs $e$ are constrained or flattened inward by the sides of the holes, as to occupy the grooves or recesses $c$, as se in Fig. 2, by which means the pin $a$ is re dered free to pass on its way through the hol into the necessary position for effecting t joint, and the springs $e$, having meanwh passed through and clear of the joint-hole rebound, and, assuming their original positic as shown in Fig. 1, act as a stop or fasteni and prevent the accidental working or falli out of the pin $a$ from its joint. In like ma ner, upon partially pulling out the pin $a$, t springs $e$ will be pressed together, as in F 2, and the pin $a$, being thereby free to pa can be withdrawn from its joint.

If desired, in lieu of two grooves or cesses, $c$, and springs $e$, respectively, as shov we may use one only or more than two.

Figure 5:
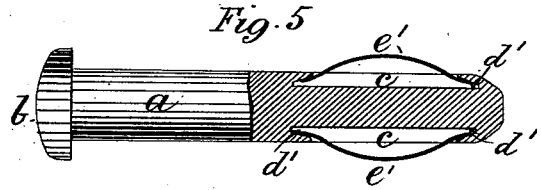

In some cases—such as when the pin $a$ is small in diameter for enabling the springs $e$ be attached thereto, as described—both end: the grooves or recesses $c$ are formed with pockets $d$ $d'$, as shown in Fig. 5, and springs $e'$, in lieu of being fixed at one enc the pin $a$, play freely at both ends within pockets $d$ $d'$, their action being similar w this exception to that described in Figs. 1 t We are aware that thill-coupling pins hav springs fitting in a recess for the purpos affording a spring bearing-surface are not n and we do not desire to claim the same.

What we claim is—

A coupling-pin having a head or sto one end and a spring secured in a pock recess at or near the other end, so as to fc a spring-stop, substantially as and for purpose specified.

In testimony whereof we affix our si tures in presence of two witnesses.

MORRISON RENSHAW
WILLIAM H. HORNE]

Witnesses:
S. L. SCHRADER,
AUGUSTE L. PRIEST.